United States Patent
Zhang et al.

(10) Patent No.: US 10,663,372 B2
(45) Date of Patent: May 26, 2020

(54) BEARING FAILURE DETECTION IN A HYDRAULIC FRACTURING RIG

(71) Applicant: Caterpillar Inc., Deerfield, IL (US)

(72) Inventors: Yanchai Zhang, Dunlap, IL (US); Yong Sun, Dunlap, IL (US); Mingang Wang, Dunlap, IL (US); Xuefei Hu, Dunlap, IL (US); Zhaoxu Dong, Dunlap, IL (US); Chunhui Pan, Edwards, IL (US)

(73) Assignee: Caterpillar Inc., Peoria, IL (US)

( * ) Notice: Subject to any disclaimer, the term of this patent is extended or adjusted under 35 U.S.C. 154(b) by 103 days.

(21) Appl. No.: 15/984,539

(22) Filed: May 21, 2018

(65) Prior Publication Data

US 2019/0353557 A1 Nov. 21, 2019

(51) Int. Cl.
*G01M 13/045* (2019.01)
*E21B 41/00* (2006.01)
*G01M 13/028* (2019.01)
*E21B 43/26* (2006.01)

(52) U.S. Cl.
CPC ....... *G01M 13/045* (2013.01); *E21B 41/0092* (2013.01); *E21B 43/26* (2013.01); *G01M 13/028* (2013.01)

(58) Field of Classification Search
CPC .................. E21B 41/0092; G01M 13/045
See application file for complete search history.

(56) References Cited

U.S. PATENT DOCUMENTS

| | | | |
|---|---|---|---|
| 5,407,265 A | 4/1995 | Hamidieh et al. | |
| 6,053,047 A | 4/2000 | Dister et al. | |
| 6,648,082 B2 | 11/2003 | Schultz et al. | |
| 8,544,331 B2 | 10/2013 | Liang et al. | |
| 9,920,615 B2 | 2/2018 | Zhang et al. | |
| 2006/0266555 A1* | 11/2006 | Chen | E21B 7/067 175/61 |
| 2015/0160101 A1* | 6/2015 | Gao | G01M 13/028 702/6 |
| 2016/0216171 A1* | 7/2016 | Moakler | G01M 1/22 |
| 2017/0231626 A1 | 8/2017 | Shelton, IV et al. | |
| 2018/0284735 A1* | 10/2018 | Cella | G05B 23/024 |

FOREIGN PATENT DOCUMENTS

| | | |
|---|---|---|
| CN | 101819093 | 9/2010 |
| EP | 1097363 | 12/2007 |
| WO | 2011006528 | 1/2011 |

\* cited by examiner

*Primary Examiner* — Shane Bomar
(74) *Attorney, Agent, or Firm* — Harrity & Harrity LLP (57) ABSTRACT

A rig management system is disclosed. The rig management system may be configured to receive vibration data from a set of sensors installed on one or more elements of a hydraulic fracturing rig. The rig management system may be configured to perform a first processing of the vibration data utilizing a moving window technique to identify a possible failure of a set of bearings. The rig management system may be configured to perform a second processing utilizing a set of processing techniques after identifying the possible failure of the set of bearings. The rig management system may be configured to determine that the possible failure is an actual failure based on a result of performing the second processing. The rig management system may be configured to perform an action after determining that the possible failure is the actual failure.

18 Claims, 4 Drawing Sheets

BEARING FAILURE DETECTION IN A HYDRAULIC FRACTURING RIG

TECHNICAL FIELD

The present disclosure relates generally to a management system in a machine and, more particularly, to a management system for bearing failure detection in a machine, such as a hydraulic fracturing rig.

BACKGROUND

A machine, particularly one powered by a combustion engine (e.g., a gasoline powered engine or a diesel powered engine) may include elements, such as a transmission, a drive shaft, and a set of bearings coupled to the transmission and/or the driveshaft. Detecting, or predicting, a failure of the set of bearings may be difficult or impossible using a set of sensors installed on the elements of the machine (e.g., a set of sensors configured to measure vibrations from the elements of the machine). For example, placing the set of sensors on or near the set of bearings may not be feasible given rotational motions of the set of bearings and/or the drive shaft. In addition, placing the set of sensors on another element of the machine may introduce attenuation to vibrations from the set of bearings and/or noise in the form of vibrations from elements other than the set of bearings.

One attempt at determining faults in multiple bearings using one vibration sensor is disclosed in U.S. Pat. No. 6,053,047 that issued to Dister, et al. on Apr. 25, 2000 ("the '047 patent"). In particular, the ∝047 patent discloses a diagnostic system and method for obtaining and using vibration data for machine diagnosis and failure prediction. The '047 patent describes that an accelerometer collects analog vibration data which is converted into a digital vibration signal. The processing performed on the vibration data by the processor includes a process referred to as demodulation. One demodulation technique, sometimes referred to as enveloping, is performed by the processor to synthesize the digital vibration data into a form usable for failure analysis. The digital vibration data enters the processor and passes through a band pass filter which removes frequencies outside the scope of interest and within the dynamic range of the processor to form a filtered signal. The filtered signal passes through a rectifier, for example a diode, which forms a rectified signal. The rectified signal passes through a low pass filter which removes the high frequencies to form a relatively low frequency signal. The low frequency signal is passed through a capacitor to produce a demodulated signal. A fast Fourier transform (FFT) is performed on the demodulated signal by an FFT operator to produce a vibration spectrum.

While the diagnostic system and method of the '047 patent may disclose obtaining and using vibration data for machine diagnosis and failure prediction, the '047 patent does not disclose techniques for generating a model of operating conditions of an element of a machine to detect abnormal operation of the element, performing an initial processing step to identify a possible failure of the element of the machine, and/or performing an action to modify operation of the machine after detecting, or predicting, a failure of the element.

The rig management system of the present disclosure solves one or more of the problems set forth above and/or other problems in the art.

SUMMARY

In one aspect, the present disclosure is related to a method that may include receiving, by a device, vibration data from a set of sensors installed on one or more elements of a hydraulic fracturing rig. The vibration data may indicate a measure of vibration of multiple elements of the hydraulic fracturing rig. The multiple elements may include: a driveshaft, and a set of bearings associated with the driveshaft. The set of sensors may not be installed on the driveshaft or the set of bearings. The method may include performing, by the device, a first processing of the vibration data utilizing a moving window technique to identify a possible failure of the set of bearings. The method may include performing, by the device, a second processing utilizing a set of processing techniques after identifying the possible failure of the set of bearings. The set of processing techniques may include: utilizing one or more data filters, or utilizing a peak-to-peak value check. The method may include determining, by the device, that the possible failure is an actual failure based on a result of performing the second processing. The method may include performing, by the device, an action after determining that the possible failure is the actual failure.

In another aspect, the present disclosure is related to a rig management system that includes one or more memories; and one or more processors, communicatively coupled to the cane or more memories, configured to receive vibration data from a set of sensors installed on one or more elements of a hydraulic fracturing rig. The vibration data may indicate a measure of vibration of multiple elements of the hydraulic fracturing rig. The set of sensors may not be installed on an element, of the multiple elements, to be monitored for a possible failure. The one or more processors may be configured to perform a first processing of the vibration data utilizing a moving window technique to identify the possible failure of the element. The one or more processors may be configured to perform a second processing utilizing a set of processing techniques after identifying the possible failure of the element. The set of processing techniques may include utilizing one or more data filters, or utilizing a peak-to-peak value check. The one or more processors may be configured to determine that the possible failure is an actual failure based on a result of performing the second processing. The one or more processors may be configured to perform an action after determining that the possible failure is the actual failure. The action may include powering down the hydraulic fracturing rig based on determining that the possible failure is the actual failure.

In yet another aspect, the present disclosure is related to a hydraulic fracturing rig that includes multiple elements; and a rig management system. The rig management system may be configured to utilize a model to determine an expected measure of vibration of multiple elements of the hydraulic fracturing rig for operating conditions of the hydraulic fracturing rig based on operating condition data. The rig management system may be configured to receive vibration data from a set of sensors installed on one or more elements of the hydraulic fracturing rig. The vibration data may indicate a measure of the vibration of the multiple elements of the hydraulic fracturing rig. The multiple elements may include a driveshaft, and a set of bearings associated with the driveshaft. The rig management system may be configured to perform a first processing of the vibration data utilizing a moving window technique to identify a possible failure of the set of bearings. The rig management system may be configured to perform a second processing utilizing a set of processing techniques or the model after identifying the possible failure of the set of bearings. The rig management system may be configured to determine that the possible failure is an actual failure based on a result of performing the second processing. The rig management system may be configured to perform an action after determining that the possible failure is the actual failure.

DETAILED DESCRIPTION

This disclosure relates to a rig management system. The rig management system has universal applicability to any machine utilizing such a rig management system. The term "machine" may refer to any machine that performs an operation associated with an industry such as, for example, mining, construction, farming, transportation, or any other industry. As some examples, the machine may be a vehicle, a hydraulic fracturing rig (e.g., a trailer-mounted hydraulic fracturing rig), a backhoe loader, a cold planer, a wheel loader, a compactor, a feller buncher, a forest machine, a forwarder, a harvester, an excavator, an industrial loader, a knuckleboom loader, a material handler, a motor grader, a pipelayer, a road reclaimer, a skid steer loader, a skidder, a telehandler, a tractor, a dozer, a tractor scraper, or other paving or underground mining equipment. Moreover, one or more implements may be connected to the machine and driven from the rig management system.

Figure 1:
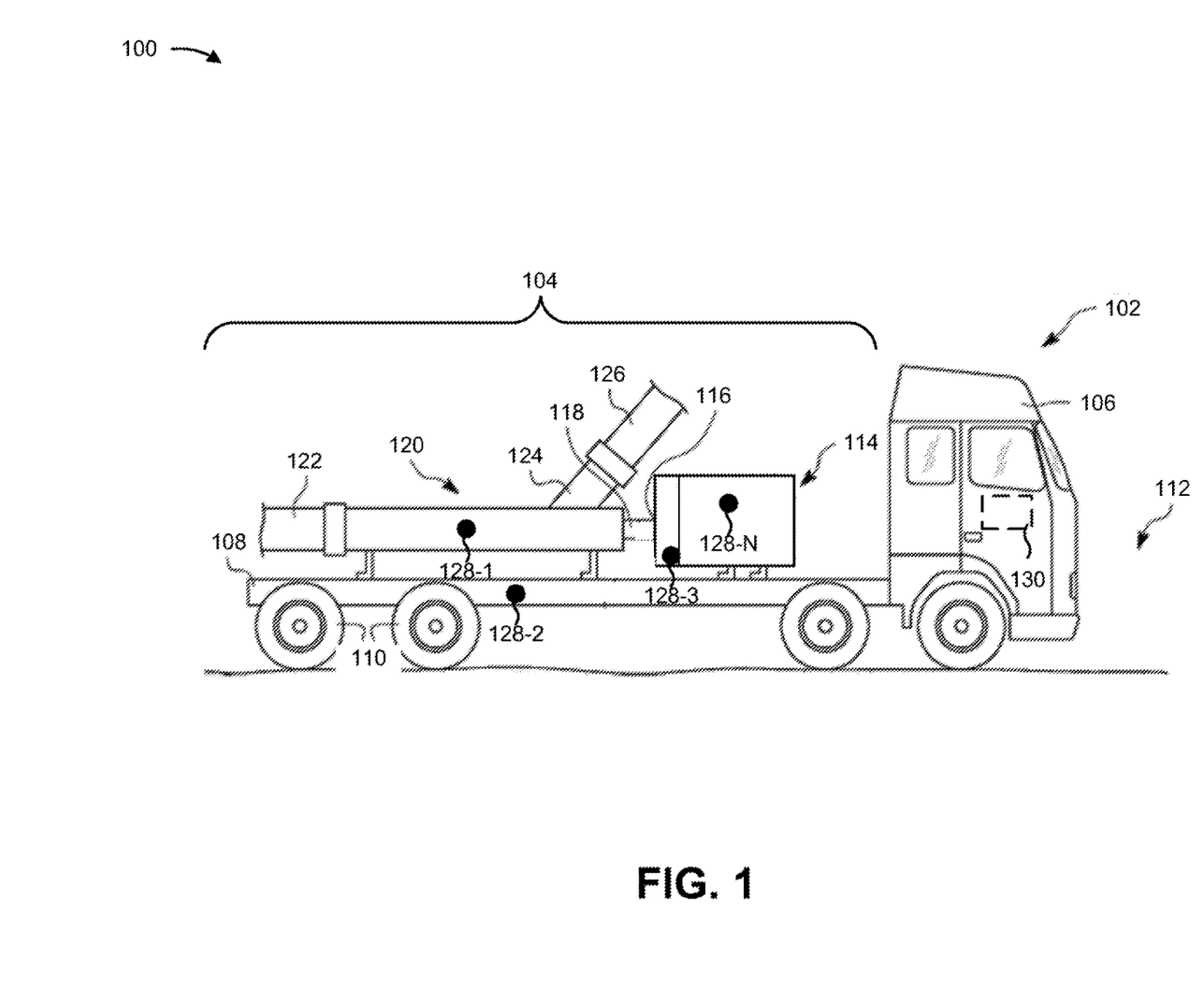
FIG. 1 is a diagram of an example hydraulic fracturing system that includes a rig management system for bearing failure detection in a hydraulic fracturing rig of the hydraulic fracturing system.

FIG. 1 is a diagram 100 of a hydraulic fracturing system that includes a rig management system for bearing failure detection in a hydraulic fracturing rig of the hydraulic fracturing system. As shown, FIG. 1 includes a hydraulic fracturing system 102 that may include one or more machines related to hydraulic fracturing. For example, the one or more machines are shown as a hydraulic fracturing rig 104 and an operator control station 106. Hydraulic fracturing rig 104 may be mobile and may be towed by operator control station 106. In some implementations, hydraulic fracuring rig 104 may be operatively connected to operator control station 106 such that an operator may operate hydraulic fracturing rig 104 from operator control station 106.

Hydraulic fracturing rig 104 may include one or more elements. The one or more elements of hydraulic fracturing rig 104 may include a frame 108, such as a frame of a flatbed trailer, a chassis, and/or the like. In some implementations, frame 108 may include ground engaging members 110, such as wheels (shown in FIG. 1), a jack (e.g., a drop leg jack), and/or the like. In some implementations, hydraulic fracturing system 102 may be deployed to a worksite 112, such as a site for hydraulic fracturing. In some implementations, different worksites 112 may include different operating conditions, such as different temperatures, different humidity levels, different foundation firmness for different foundations on which hydraulic fracturing system 102 may be deployed (e.g., soil, clay, rock, and/or the like), and/or the like. Different operating conditions may impact operation of hydraulic fracturing rig 104, as described elsewhere herein.

As further shown in FIG. 1, hydraulic fracturing rig 104 may include an engine 114. Engine 114 may be a combustion powered engine, such as a gasoline powered engine, a diesel engine, and/or the like. In some implementations, engine 114 may power one or more other elements of hydraulic fracturing rig 104, such as a transmission 116, a driveshaft 118, a set of bearings associated with transmission 116 and/or driveshaft 118 (not shown in FIG. 1), a hydraulic fracturing pump 120, and/or an outlet pipe 122. In some implementations, torque from engine 114 may be transferred through transmission 116 to hydraulic fracturing pump 120 using driveshaft 118. In some implementations, outlet pipe 122 may discharge pressurized fracturing fluid into a bore in worksite 112.

As further shown in FIG. 1, hydraulic fracturing rig 104 may include an inlet pipe 124. For example, inlet pipe 124 may be connected to hydraulic fracturing pump 120. In some implementations, hydraulic fracturing rig 104 may include a conduit 126. In some implementations, fracturing fluid may flow into hydraulic fracturing pump 120 via inlet pipe 124 and/or conduit 126.

As further shown in FIG. 1, hydraulic fracturing rig 104 may include a set of sensors 128 (e.g., shown as sensors 128-1 through 128-N (N≥1)). For example, the set of sensors 128 may be configured to gather vibration data that indicates measures of vibrations of elements of hydraulic fracturing rig 104 (e.g., of the set of bearings, of frame 108, of engine 114, of transmission 116, of driveshaft 118, of hydraulic fracturing pump 120, and/or the like). In some implementations, the set of sensors 128 may be installed on various elements to monitor operation of the various elements. Additionally, or alternatively, the set of sensors 128 may be installed on elements other than those to be monitored. For example, when the set of sensors 128 is to monitor the set of bearings for a failure or a possible failure, the set of sensors 128 may need to be installed on elements other than the set of bearings and/or driveshaft 118, due to the rotational nature of the set of bearings and driveshaft 118. In some implementations, the set of sensors 128 (or another set of sensors 128 not shown in FIG. 1) may be configured to gather operating condition data related to the operating condition of hydraulic fracturing rig 104, as described elsewhere herein.

As further shown in FIG. 1, hydraulic fracturing system 102 may include a rig management system 130. In some implementations, rig management system 130 may be installed on a computing device associated with operator control station 106. In some implementations, rig management system 130 may be installed on a computing device associated with hydraulic fracturing rig 104 (e.g., may be installed on a computer configured in engine 114). In some implementations, rig management system 130 may be electronically connected to the set of sensors 128, to a computing device associated with an element of hydraulic fracturing rig 104, as described elsewhere herein, and/or the like (e.g., via wired or wireless connections). In some implementations, rig management system 130 may be implemented at a location different from that described above (e.g., may be implemented remote from hydraulic fracturing system 102). For example, rig management system 130 may be cloud-based and/or deployed in a data center and may be in communication with hydraulic fracturing rig 104 and/or operator control station 106 via a network (e.g., the Internet, a cellular network, and/or the like).

In some implementations, rig management system 130 may generate a model for the operating condition of hydraulic fracturing rig 104. For example, rig management system 130 may receive operating condition data and may generate a model related to normal measures of vibrations of elements of hydraulic fracturing rig 104 based on the operating condition data. Additionally, or alternatively, rig management system 130 may process vibration data from the set of sensors 128 to detect a possible failure or an actual failure of an element of hydraulic fracturing rig 104, such as the set of bearings. These and other functions of rig management system 130 are described elsewhere herein.

As indicated above, FIG. 1 is provided as an example. Other examples are possible and may differ from what was described in connection with FIG. 1. In some implementations, hydraulic fracturing system 102 may include additional elements and/or components, fewer elements and/or components, different elements and/or components, or differently arranged elements and/or components than those shown in FIG. 1. In addition, FIG. 1 may show simplified versions of the elements and/or components of hydraulic fracturing system 102 for explanatory and/or illustrative purposes.

Figure 2:
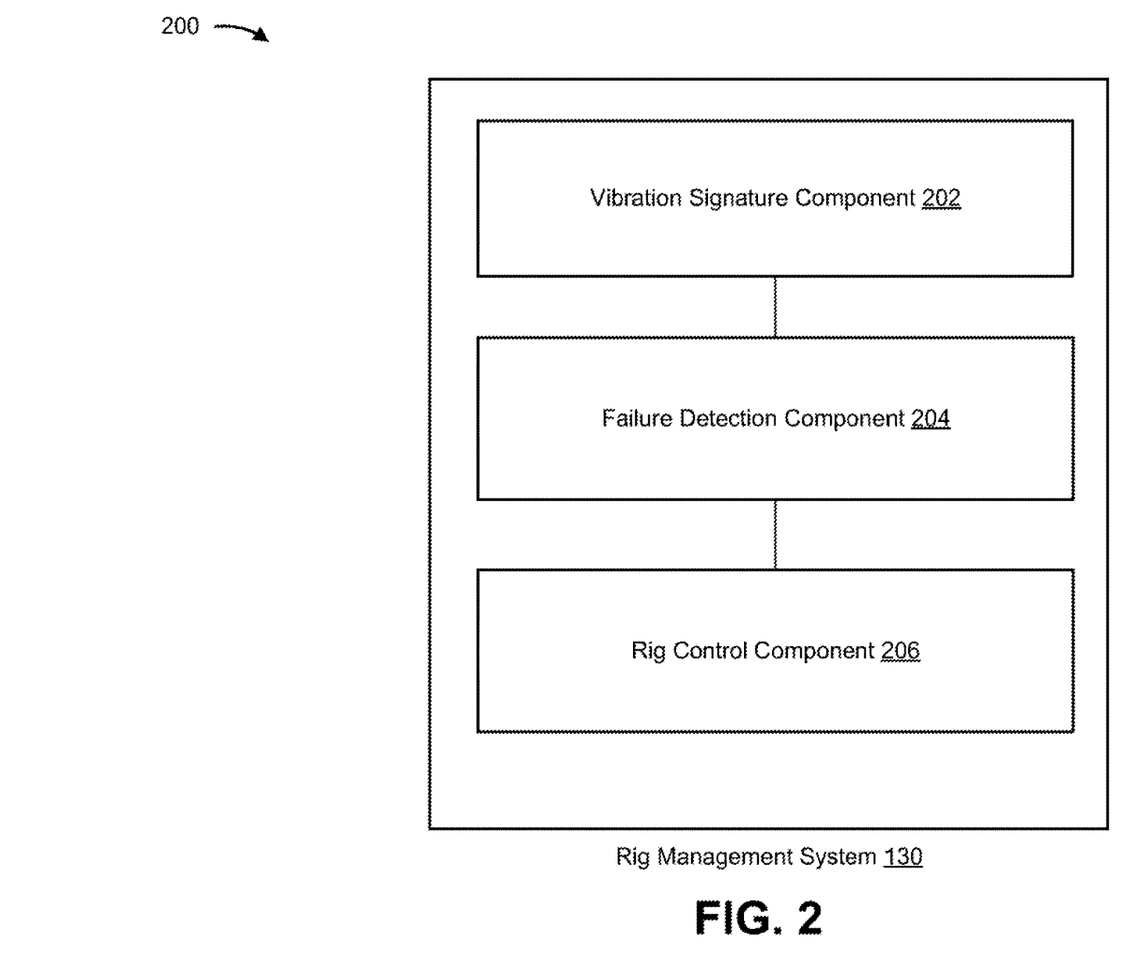
FIG. 2 is a diagram of one or more example components of the rig management system of FIG. 1.

FIG. 2 is a diagram 200 of one or inure example components of the rig management system of FIG. 1. As shown in FIG. 2, rig management system 130 may include a vibration signature component 202, a failure detection component 204, and/or a rig control component 206.

Vibration signature component 202 may include one or more components configured to generate a model for an operating condition of hydraulic fracturing rig 104. In some implementations, vibration signature component 202 may be configured to receive operating condition data from a set of sensors 128 installed on hydraulic fracturing system 102. For example, vibration signature component 202 may be configured to receive temperature data that identifies an air temperature at worksite 112, humidity data that identifies an amount of humidity at worksite 112, foundation firmness data that identifies a firmness of a foundation of hydraulic fracturing rig 104 (e.g., a soil firmness, whether hydraulic fracturing rig 104 is deployed on soil, rock, or clay, and/or the like), and/or the like. Additionally, or alternatively, vibration signature component 202 may be configured to receive, from processor and/or memory resources associated with hydraulic fracturing system 102, maintenance data that indicates an upcoming maintenance schedule of hydraulic fracturing rig 104 and/or prior repair and/or maintenance history of hydraulic fracturing rig 104, configuration data that identifies a configuration of elements of hydraulic fracturing rig 104 (e.g., a version of the elements, a date of manufacture of the elements, and/or the like), and/or the like. In some implementations, rig management system 130 may be configured to generate the model based on data received by vibration signature component 202, as described elsewhere herein.

Failure detection component 204 includes one or more components configured to detect a failure (or a possible failure) of an element of hydraulic fracturing rig 104 and/or to predict a failure of an element of hydraulic fracturing rig 104. For example, failure detection component 204 may include one or more components configured to detect a failure (or a possible failure) and/or to predict a failure of a set of bearings associated with hydraulic fracturing rig 104. In some implementations, failure detection component 204 may be configured to receive, from a set of sensors 128, vibration data that indicates a measure of a vibration of an element of hydraulic fracturing rig 104 and failure detection component 204 may be further configured to use the model generated by vibration signature component 202 to process the vibration data to detect a failure a possible failure) and/or to predict a failure of the element, as described elsewhere herein.

Rig control component 206 may include one or more components configured to control one or more elements of hydraulic fracturing rig 104. For example, rig control component 206 may include one or more components configured to modify an operation of one or more elements of hydraulic fracturing rig 104. In some implementations, rig control component 206 may be configured to detect output of failure detection component 204 (e.g., output that indicates detection of a failure (or a possible failure) of an element and/or prediction of a failure of an element) and may be further configured to control one or more elements of hydraulic fracturing rig 104 based on the output, as described elsewhere herein.

As indicated above, FIG. 2 is provided as an example. Other examples are possible and may differ from what was described in connection with FIG. 2. In some implementations, rig management system 130 may include additional components, fewer components, different components, or differently arranged components than those shown in FIG. 2.

Figure 3:
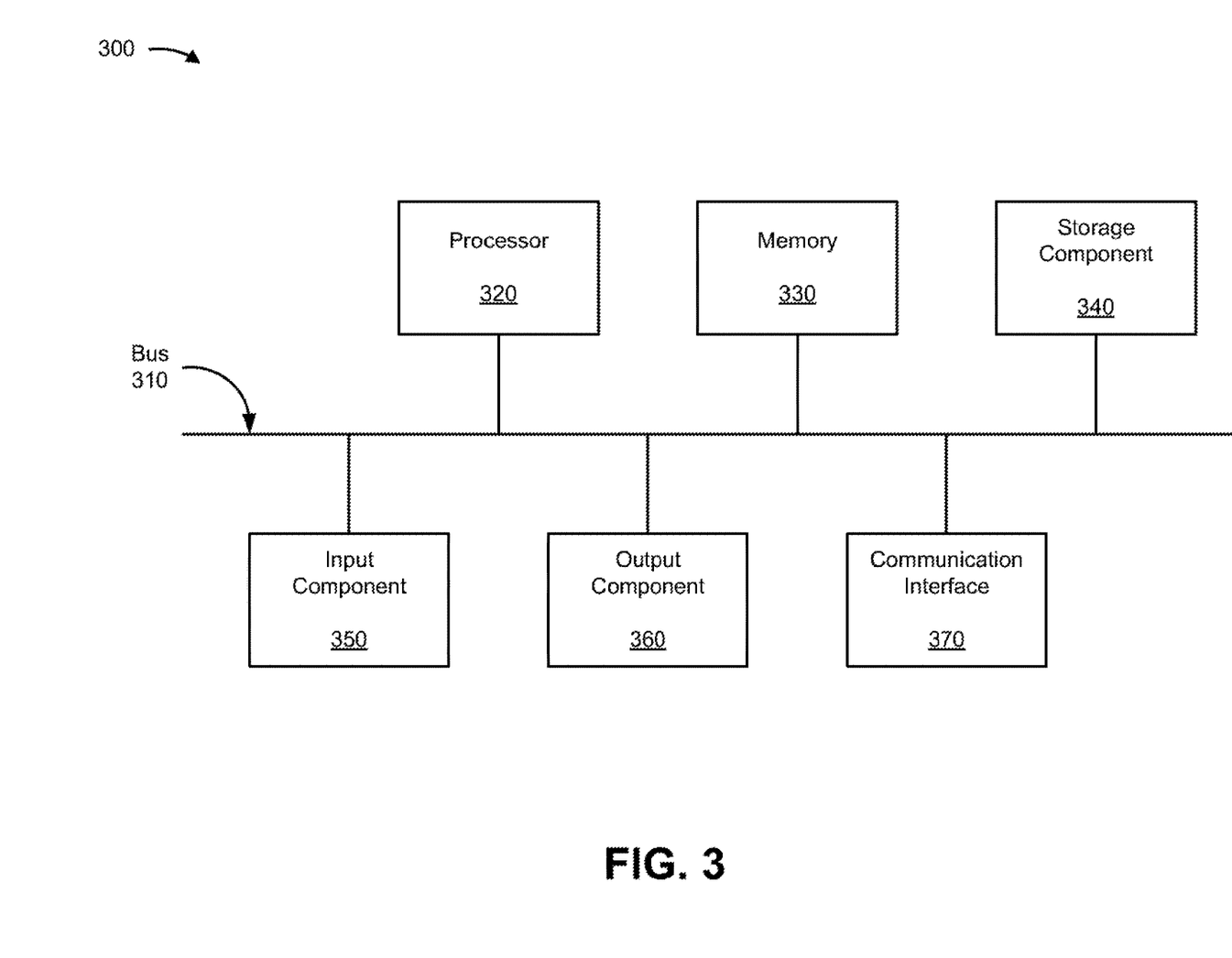
FIG. 3 is a diagram of additional example components of one or more devices described herein.

FIG. 3 is a diagram of example components of a device 300. Device 300 may correspond to sensor 128, rig management system 130 vibration signature component 202, failure detection component 204, and/or rig control component 206. In some implementations, sensor 128, rig management system 130, vibration signature component 202, failure detection component 204, and/or rig control component 206 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (CPU), an accelerated processing unit (APU), a microprocessor, a microcontroller, a digital signal processor (DSP), a field-programmable gate array (FPGA), ail application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
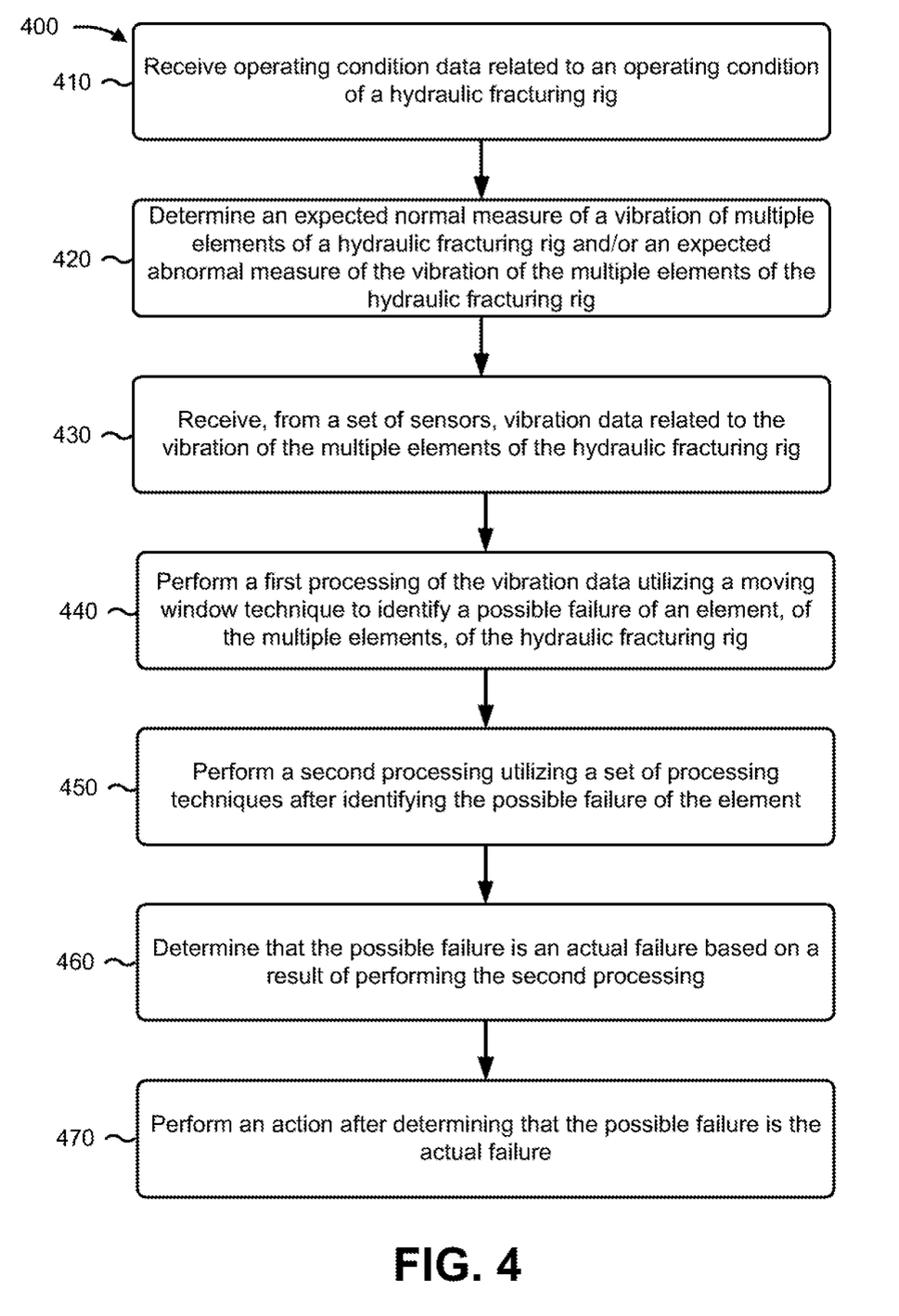
FIG. 4 is a flow chart of an example process for bearing failure detection in a hydraulic fracturing rig.

FIG. 4 is a flow chart of an example process 400 for bearing failure detection in a hydraulic fracturing rig. In some implementations, one or more process blocks of FIG. 4 may be performed by rig management system 130. In some implementations, one or more process blocks of FIG. 4 may be performed by another device or a group of devices separate from or including rig management system 130, such as sensor 128, vibration signature component 202, failure detection component 204, or rig control component 206.

As shown n FIG. 4, process 400 may include receiving operating condition data related to an operating condition of a hydraulic fracturing rig (block 410). For example, rig management system 130 (e.g., using processor 320, input component 350, communication interface 370, and/or the like) may receive operating condition data related to an operating condition of hydraulic fracturing rig 104. In some implementations, hydraulic fracturing rig 104 may receive the operating condition data when hydraulic fracturing rig 104 is deployed to worksite 112, prior to powering on hydraulic fracturing rig 104, periodically, according to a schedule, on demand, based on causing sensor 128 to gather the operating condition data (e.g., by sending a set of instructions to sensor 128), and/or the like.

In some implementations, an operating condition may include one or more factors that may impact operation of hydraulic fracturing rig 104. For example, an operating condition may include weather and/or environmental conditions at worksite 112, ground firmness and/or composition at worksite 112, a maintenance schedule of elements of hydraulic fracturing rig 104, a configuration of elements of hydraulic fracturing rig 104 (e.g., types of elements included in hydraulic fracturing rig 104, a version of the elements included in hydraulic fracturing rig 104, and/or the like), and/or the like. In some implementations, operating condition data may relate to an operating condition and may be similar to that described elsewhere herein.

In some implementations, rig management system 130 may use operating condition data to determine an expected measure of a vibration of elements of hydraulic fracturing rig 104, such as an expected vibration signature (e.g., an expected normal measure, an expected abnormal measure, and/or the like), as described elsewhere herein.

In this way, rig management system 130 may receive operating condition data related to an operating condition of hydraulic fracturing rig 104 prior to determining an expected measure of a vibration of elements of hydraulic fracturing rig 104.

As further shown in FIG. 4, process 400 may include determining an expected normal measure of a vibration of multiple elements of a hydraulic fracturing rig and/or an expected abnormal measure of the vibration of the multiple elements of the hydraulic fracturing rig (block 420). For example, rig management system 130 (e.g., using vibration signature component 202, processor 320, memory 330, and/or the like) may determine an expected normal measure of a vibration of multiple elements of hydraulic fracturing rig 104 and/or an expected abnormal measure of the vibration of the multiple elements of hydraulic fracturing rig 104.

In some implementations, rig management system 130 may utilize a model to determine an expected normal measure of a vibration and/or an expected abnormal measure of the vibration based on input to the model (e.g., based on operating condition data for hydraulic fracturing rig 104 input to the model). In some implementations, the model may indicate an expected normal operation of elements of hydraulic fracturing rig 104 (e.g., an expected normal measure of a vibration of an element of hydraulic fracturing rig 104). For example, rig management system 130 may input operating condition data to the model and the model may indicate (e.g., output) an expected normal vibration signature for a measure of a vibration from an dement of hydraulic fracturing rig 104. Additionally, or alternatively, rig management system 130 may input operating condition data to the model and the model may indicate an expected abnormal measure of a vibration of an element of hydraulic fracturing rig 104 (e.g., may indicate an expected vibration signature for a measure of a vibration from an element of hydraulic fracturing rig 104).

In some implementations, rig management system 130 may use output from the model to process measures of vibrations from elements of hydraulic fracturing rig 104 to detect a failure (or a possible failure) of an element (e.g., a set of bearings) of hydraulic fracturing rig 104. For example, rig management system 130 may use an expected normal measure of a vibration and/or an expected abnormal measure of the vibration output by the model to process measures of vibrations gathered during operation of hydraulic fracturing rig 104, such as to detect a failure (or possible failure) of an element of hydraulic fracturing rig 104 and/or to predict the failure of the element of hydraulic fracturing rig 104.

In some implementations, rig management system 130 may generate the model based on having been trained on a training set of operating condition data (e.g., that includes various sets of operating condition data and corresponding expected vibration signatures for normal operation or a failure for the various sets of operating condition data). In some implementations, rig management system 130 may receive a previously unreceived set of operating condition data from sensor 128 and may generate the model for the set of operating condition data based on having been trained. For example, rig management system 130 may generate a model of expected vibration signatures for normal operation of hydraulic fracturing rig 104 and/or for abnormal operation of hydraulic fracturing rig 104 (e.g., a failure (or possible failure) of an element of hydraulic fracturing rig 104, a predicted failure of hydraulic fracturing rig 104, and/or the like). Continuing with the previous example, rig management system 130 may generate the model based on weather and/or environmental conditions at worksite 112, a configuration of elements of hydraulic fracturing rig 104, and/or the like.

In some implementations, rather than generating a model, rig management system 130 may receive a model from another device. For example, a server device may generate the model based on having been trained in a manner similar to that described above and may provide the model to rig management system 130 (e.g., may pre-load rig management system 130 with the model, may receive a request from rig management system 130 for the model, and/or the like).

In some implementations, rig management system 130 may perform a lookup to identify expected vibration signatures for hydraulic fracturing rig 104. For example, rig management system 130 may perform a lookup of the operating condition data in a data structure and may identify expected vibration signatures for the operation condition of hydraulic fracturing rig 104. Additionally, or alternatively, rig management system 130 may use some operating condition data to identify a model to use to determine expected measures of a vibration (e.g., a pre-generated and/or pre-loaded model) and may use other operating condition data as input to the model. For example, rig management system 130 may use first operating condition data that identifies a configuration of elements of hydraulic fracturing rig 104 to identify a model from a set of models, and may use second operating condition data that identifies weather conditions, foundation firmness, and/or the like as input to the model.

In some implementations, different elements of hydraulic fracturing rig 104 and/or different sensors 128 may be associated with different models. For example, when identifying a model to use to process vibration data from hydraulic fracturing rig 104, rig management system 130 may identify a model based on an element to be monitored, based on locations of sensors 128 (e.g., different locations may cause sensor 128 to gather different vibrations from different elements, to gather the vibration data at different intensities, and/or the like), and/or the like. Continuing with the previous example, a first sensor 128 that is located on hydraulic fracturing pump 120 may gather vibration data that has a unique vibration signature from vibration data that a second sensor 128 gathers. In this way, rig management system 130 may be capable of identifying a failure (or a possible failure) of an element of hydraulic fracturing rig 104 on a sensor-by-sensor basis to identify a likely element that is failing for possibly failing), may use vibration data gathered by a first sensor 128 to confirm detection of a failure (or a possible failure) in vibration data gathered by a second sensor 128, and/or the like.

In this way, rig management system 130 may generate a model for the operating condition prior to receiving vibration data.

As further shown in FIG. 4, process 400 may include receiving, from a set of sensors, vibration data related to the vibration of the multiple elements of the hydraulic fracturing rig (block 430). For example, rig management system 130 (e.g., using processor 320, input component 350, communication interface 370, and/or the like) may receive, from a set of sensors 128, vibration data related to the vibration of the multiple elements of hydraulic fracturing rig 104.

In some implementations, rig management system 130 may receive the vibration data during operation of hydraulic fracturing rig 104 (e.g., during hydraulic fracturing), periodically, according to a schedule, on demand, based on causing sensor 128 to provide the vibration data (e.g., by sending a set of instructions to sensor 128), and/or the like. In some implementations, the vibration data may include measures of vibrations for multiple elements, including a particular element to be monitored. For example, and assuming that a set of bearings is to be monitored, the vibration data may include measures of vibrations for the set of bearings, including a set of engine bearings, a set of transmission bearings, a set of pump power end bearings, and/or the like, as well as for engine 114, transmission 116, driveshaft 118, hydraulic fracturing pump 120, and/or the like. In other words, the vibration data may include noise from multiple elements of hydraulic fracturing rig 104.

In some implementations, rig management system 130 may receive the vibration data from a set of sensors 128 that is not installed on elements of hydraulic fracturing rig 104 that are to be monitored. For example, assuming that rig management system 130 is to monitor a set of bearings associated with hydraulic fracturing rig 104, rig management system 130 may receive the vibration data from a set of sensors 128 that is installed on elements of hydraulic fracturing rig 104 other than the set of bearings. As a result, the vibration data for the set of bearings that rig management system 130 receives may be affected by significant attenuation based on having traveled through one or more other elements of hydraulic fracturing rig 104 prior to being gathered by the set of sensors 128.

In this way, rig management system 130 may receive vibration data prior to performing a first processing of the vibration data.

As further shown in FIG. 4, process 400 may include performing a first processing of the vibration data utilizing a moving window technique to identify a possible failure of an element, of the multiple elements, of the hydraulic fracturing rig (block 440). For example, rig management system 130 (e.g., using failure detection component 204, processor 320, and/or the like) may perform a first processing of the vibration data utilizing a moving window technique to identify a possible failure of an element, of the multiple elements, of hydraulic fracturing rig 104. In some implementations, rig management system 130 may perform the first processing using raw unprocessed vibration data to minimize upfront processing. In some implementations, rig management system 130 may perform the first processing utilizing a moving window technique after utilizing one or more band pass filters to process vibration data (e.g., after utilizing a notch filter and/or a high frequency band pass filter).

In some implementations, the moving window technique may include processing vibration data between two points in time (e.g., a time window) on a rolling basis. For example, rig management system 130 may process vibration data for a 30 second window of time, a 1 hour window of time, a 10 microsecond window of time, and/or the like. In some implementations, when processing the vibration data using the moving window technique, rig management system 130 may determine whether the vibration data satisfies a threshold between two points in time as the vibration data is received (e.g., a pre-loaded threshold, a threshold identified in output from the model, a threshold based on an expected vibration signature, and/or the like). For example, rig management system 130 may determine whether vibration data from a particular sensor 128 satisfies a threshold within the window, whether vibration data from a threshold quantity of sensors 128 satisfies a threshold, whether an average value (e.g., amplitude) of vibration data satisfies a threshold within the window, and/or the like. In some implementations, the threshold may be based on the vibration data. For example, rig management system 130 may modify the threshold based on changes in operating conditions of hydraulic fracturing rig 104 (e.g., as weather conditions change), based on expected changes in vibration data for hydraulic fracturing rig 104 (e.g., prolonged operation of hydraulic fracturing rig 104 may correspond to particular expected changes in vibration data due to heat and/or friction generated by the elements of hydraulic fracturing rig 104), and/or the like.

In some implementations, based on using the moving window technique, rig management system 130 may identity a possible failure. For example, because rig management system 130 may perform the first processing on raw unprocessed data, rig management system 130 may not be capable of identifying a failure (or predicting a failure) of the element of hydraulic fracturing rig 104 at a threshold accuracy (e.g., due to attenuation of vibrations measured by the set of sensors 128, noise included in the vibration data, and/or the like). As such, when rig management system 130 determines that the vibration data satisfies a threshold, rig management system 130 may merely identify a possible failure for further processing, in some implementations.

In this way, rig management system 130 may perform a first processing of the vibration data prior to performing a second processing utilizing a set of processing techniques and/or the model.

As further shown in FIG. 4, process 400 may include performing a second processing utilizing a set of processing techniques after identifying the possible failure of the element (block 450). For example, rig management system 130 (e.g., using failure detection component 204, processor 320, and/or the like) may perform a second processing utilizing a set of processing techniques and/or the model after identifying the possible failure of the element. In some implementations, the set of processing techniques may include utilizing one or more data filters to process the vibration data and/or utilizing a peak-to-peak value check to process the vibration data.

In some implementations, rig management system 130 may process the vibration data using a band stop filter. For example, a band stop filter may include a filter that passes frequencies of the vibration data unaltered but rejects frequencies that are in a specific range to a low level that satisfies a threshold. Specifically, in some implementations, rig management system 130 may process the vibration data utilizing a notch filter, which may include a particular type of band stop filter with a narrow stopband. In some implementations, the band pass filter frequency can be dynamic and can change based on bearing design, operating conditions, such as engine speed, transmission speed, or pump speed, and/or the like. For example, different band pass filters may have different frequencies based different engine speeds, different transmission speeds, different pump speeds, and/or the like for different hydraulic fracturing rigs 104.

Additionally, or alternatively, rig management system 130 may process the vibration data using a band pass filter. For example, a band pass filter may include a filter that passes frequencies of vibration data within a range and rejects frequencies outside of that range. Specifically, rig management system 130 may process the vibration data using a high-frequency band pass filter, in some implementations.

Additionally, or alternatively, rig management system 130 may process the vibration data using a peak-to-peak value check. For example, rig management system 130 may use the peak-to-peak value check to determine a difference between the maximum positive amplitude of the vibration data in a period of time (e.g., a moving window of time) and the maximum negative amplitude of the vibration data in the period of time. In some implementations, rig management system 130 may be capable of using the peak-to-peak value check to determine whether the vibration data indicates an expected vibration signal for normal operation of an element of hydraulic fracturing rig 104, an expected vibration signal for abnormal operation of an element of hydraulic fracturing rig 104, and/or the like. In some implementations, by utilizing the one or more filters and/or the peak-to-peak value check, rig management system 130 may be able to refine the vibration data to remove noise from elements other than the element to be monitored, attenuation of a vibration prior to the vibration being detected by sensor 128, and/or the like.

In some implementations, rig management system 130 may process the vibration data utilizing the model. For example, rig management system 130 may utilize the model to determine whether the vibration data matches a known vibration signature for normal operation of elements of hydraulic fracturing rig 104, matches a known vibration signature for abnormal operation of elements of hydraulic fracturing rig 104, includes characteristics of a known vibration signature (e.g., a similar trend and/or pattern of vibrations, such as a failure trend and/or a failure pattern, a similar anomaly in the vibration data, and/or the like), and/or the like.

In some implementations, rig management system 130 may perform the second processing on vibration data from different sensors 128 separately. For example, rig management system 130 may determine whether results for a threshold quantity of sensors 128 are consistent with each other (e.g., indicate the same result), may weight results of the second processing from different sensors 128 differently (e.g., a particular sensor 128 that is located closer to an element being monitored relative to another sensor 128 may receive a heavier weight than the other sensor 128), and/or the like. Conversely, rig management system 130 may aggregate vibration data from different sensors 128 (e.g., by averaging the vibration data across multiple sensors 128, by weighting vibration data for a particular sensor 128 more than another sensor 128, and/or the like), and may perform the second processing on the aggregated vibration data.

In this way, rig management system 130 may perform a second processing prior to determining that the possible failure is an actual failure.

As further shown in FIG. 4, process 400 may include determining that the possible failure is an actual failure based on a result of performing the second processing (block 460). For example, rig management system 130 (e.g., utilizing failure detection component 204, processor 320, and/or the like) may determine that the possible failure is an actual failure based on a result of performing the second processing.

In some implementations, rig management system 130 may determine whether the vibration data satisfies a threshold (e.g., whether a value for an amplitude of the vibration data satisfies a threshold) and may determine that the potential failure is an actual failure when the vibration data satisfies the threshold. Additionally, or alternatively, rig management system 130 may determine whether the vibration data satisfies a first threshold for an amount of time that satisfies a second threshold and may determine that the possible failure is an actual failure when the vibration data satisfies the first threshold for the amount of time that satisfies the second threshold. Additionally, or alternatively, rig management system 130 may determine that a vibration signature matches a known vibration signature for an expected normal or abnormal operation of the element and may determine that the possible failure is the actual failure when the vibration signature of the vibration data matches the known vibration signature. Additionally, or alternatively, rig management system 130 may determine that a vibration signature of the vibration data includes a quantity of shared characteristics with a known vibration signature that satisfies a threshold and may determine that the possible failure is the actual failure based on the vibration data sharing a quantity of characteristics that satisfies a threshold with a known vibration signature. In some implementations, rig management system 130 may predict a failure of the element in a similar manner.

In this way, rig management system 130 may determine that the possible failure is an actual failure prior to performing an action.

As further shown in FIG. 4, process 400 may include performing an action after determining that the possible failure is the actual failure (block 470). For example, rig management system 130 (e.g., utilizing rig control component 206, processor 320, output component 360, communication interface 370, and/or the like may perform an action after determining that the possible failure is the actual failure.

In some implementations, rig management system 130 may modify operation of hydraulic fracturing rig 104 (e.g., may decrease a speed of operation of an element of hydraulic fracturing rig 104, may increase a speed of operation of an element of hydraulic fracturing rig 104, may shut down an element of hydraulic fracturing rig 104, may power up an element of hydraulic fracturing rig 104, and/or the like). For example, rig management system 130 may send a set of instructions to processor 320 installed on the element of hydraulic fracturing rig 104, may send a message to a user device (e.g., a client device, a mobile phone, and/or the like) associated with an operator of hydraulic fracturing rig 104, and/or the like. Additionally, or alternatively, rig management system 130 may start or stop operation of rig management system 130 in a similar manner. Additionally, or alternatively, rig management system 130 may generate a work order to perform maintenance on the element and may output the work order via a user device.

Additionally, or alternatively, rig management system 130 may trigger an alarm (e.g., based on detecting a possible failure or an actual failure). For example, the alarm may be associated with sensory output (e.g., light output, sound output, vibration output, and/or the like). Additionally, or alternatively, rig management system 130 may generate a report related to processing of the vibration data and may output the report via a user device. Additionally, or alternatively, rig management system 130 may send a message to a user device (e.g., that indicates a possible failure was detected, that indicates an actual failure was detected, and/or the like). Additionally, or alternatively, rig management system 130 may update the model. For example, rig management system 130 may output the vibration data and/or a result of processing the vibration data to further train the model for future processing.

In this way, rig management system 130 may perform an action after determining that the possible failure is the actual failure.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

INDUSTRIAL APPLICABILITY

The disclose rig management system 130 may be used with any machine where a technique for detecting failure of an element of the machine is needed, such as hydraulic fracturing rig 104. The disclosed rig management system 130 may monitor vibration data gathered by a set of sensors 128 to detect a failure of an element of the machine. Particularly, rig management system 130 may detect failure of an element of the machine for which a set of sensors 128 cannot be easily installed on the element, such as a set of bearings of hydraulic fracturing rig 104. As such, rig management system 130 may be capable of detecting a failure in an element of the machine when detecting the failure would otherwise be difficult or impossible (e.g., due to attenuation of vibrations of the element via one or more other elements of the machine, due to noise from other elements of the machine, and/or the like). This improves an accuracy and/or a capability of detecting a failure of an element of a machine (e.g., via noise reduction, signal attenuation compensation, and/or the like).

In addition, some implementations described herein include multiple tiers of processing vibration data (e.g., to detect a possible failure of an element and to determine that the possible failure is an actual failure). This conserves processing resources related to detecting a failure by reducing or eliminating false positive identification of a failure. In addition, some implementations described herein facilitate accurate and proactive maintenance of elements of the machine. This reduces a likelihood of a failure of an element of the machine during operation of the machine and/or deployment of the machine (which could cause significant damage to the machine or delay a project for which the machine is being used), thereby improving use of the machine. Further, by facilitating real-time monitoring of elements of the machine, some implementations described herein reduce a frequency of maintenance needed tier the machine, thereby conserving resources and/or costs associated with more frequent maintenance.

As used herein, the articles "a" and "an" are intended to include one or more items, and may be used interchangeably with "one or more." Also, as used herein, the terms "has," "have," "having," or the like are intended to be open-ended terms. Further, the phrase "based on" is intended to mean "based, at least in part, on."

The foregoing disclosure provides illustration and description, but is not intended to be exhaustive or to limit the implementations to the precise form disclosed. Modifications and variations are possible in light of the above disclosure or may be acquired from practice of the implementations. It is intended that the specification be considered as an example only, with a true scope of the disclosure being indicated by the following claims and their equivalents. Even though particular combinations of features are recited in the claims and/or disclosed in the specification, these combinations are not intended to limit the disclosure of possible implementations. Although each dependent claim listed below may directly depend on only one claim, the disclosure of possible implementations includes each dependent claim in combination with every other claim in the claim set.

What is claimed is:

1. A method, comprising:
   receiving, by a device, vibration data from a set of sensors installed on one or more elements of a hydraulic fracturing rig,
      wherein the vibration data indicates a measure of vibration of multiple elements of the hydraulic fracturing rig,
         wherein the multiple elements include:
            a driveshaft, and
            a set of bearings associated with the driveshaft,
      wherein the set of sensors is not installed on the driveshaft or the set of bearings;
   performing, by the device, a first processing of the vibration data utilizing a moving window technique to identify a possible failure of the set of bearings;
   performing, by the device, a second processing utilizing a set of processing techniques after identifying the possible failure of the set of bearings,
      wherein the set of processing techniques includes:
         utilizing one or more data filters, or
         utilizing a peak-to-peak value check;
   determining, by the device, that the possible failure is an actual failure based on a result of performing the second processing; and
   performing, by the device, an action after determining that the possible failure is the actual failure.

2. The method of claim 1, further comprising:
   receiving operating condition data related to an operating condition of the hydraulic fracturing rig prior to receiving the vibration data; and
   using a model to determine an expected measure of the vibration of the multiple elements based on the operating condition data after receiving the operating condition data.

3. The method of claim 1, wherein performing the second processing comprises:
   processing the vibration data using a band stop filter after performing the first processing;
   processing the vibration data using a band pass filter after processing the vibration data using the band stop filter;
   processing the vibration data using the peak-to-peak value check after processing the vibration data using the band pass filter; and
   wherein determining that the possible failure is the actual failure comprises:
      determining that the possible failure is the actual failure after processing the vibration data using the peak-to-peak value check.

4. The method of claim 1, wherein performing the first processing utilizing the moving window technique comprises:
   determining whether the vibration data satisfies a threshold between two time points as the vibration data is received,
      wherein the threshold is based on the vibration data between the two time points.

5. The method of claim 1, wherein performing the action comprises:
   powering down the hydraulic fracturing rig after determining that the possible failure is the actual failure.

6. The method of claim 1, wherein performing the action comprises:
   triggering a first alarm after identifying the possible failure of the set of bearings; and
   triggering a second alarm after determining that the possible failure is the actual failure, wherein the first alarm and the second alarm are different.

7. A rig management system, comprising:
   one or more memories; and
   one or more processors, communicatively coupled to the one or more memories, configured to:
      receive vibration data from a set of sensors installed on one or more elements of a hydraulic fracturing rig,
         wherein the vibration data indicates a measure of vibration of multiple elements of the hydraulic fracturing rig,
         wherein the set of sensors is not installed on an element, of the multiple elements, to be monitored for a possible failure;
      perform a first processing of the vibration data utilizing a moving window technique to identify the possible failure of the element;
      perform a second processing utilizing a set of processing techniques after identifying the possible failure of the element,
         wherein the set of processing techniques includes:
            utilizing one or more data filters, or
            utilizing a peak-to-peak value check;
      determine that the possible failure is an actual failure based on a result of performing the second processing; and
      perform an action after determining that the possible failure is the actual failure,
         wherein the action includes powering down the hydraulic fracturing rig based on determining that the possible failure is the actual failure.

8. The rig management system of claim 7, wherein the element to be monitored includes:
   a driveshaft associated with the hydraulic fracturing rig, or
   a set of bearings associated with the hydraulic fracturing rig.

9. The rig management system of claim 7, wherein the multiple elements include:
   an engine associated with the hydraulic fracturing rig,
   a transmission associated with the hydraulic fracturing rig,
   a hydraulic fracturing pump associated with the hydraulic fracturing rig, or
   a chassis associated with the hydraulic fracturing rig.

10. The rig management system of claim 7, wherein the one or more processors, when performing the action, are configured to:
   modify operation of the hydraulic fracturing rig after identifying the possible failure or after determining that the possible failure is the actual failure.

11. The rig management system of claim 7, wherein the one or more processors, when determining that the possible failure is the actual failure, are configured to:
 determine that a pattern or a trend in the vibration data matches a failure pattern or a failure trend based on utilizing a model; and
 wherein the one or more processors, when performing the action, are configured to:
  perform the action after determining that the pattern or the trend in the vibration data matches the failure pattern or the failure trend based on utilizing the model.

12. The rig management system of claim 7, wherein the one or more processors are further configured to:
 receive operating condition data from another set of sensors or a component associated with the hydraulic fracturing rig prior to receiving the vibration data,
 wherein the other set of sensors includes at least one of:
  a first sensor configured to gather temperature data,
  a second sensor configured to gather humidity data, or
  a third sensor configured to gather foundation firmness data,
 wherein the component is configured to store configuration data that identifies a configuration of the multiple elements associated with the hydraulic fracturing rig.

13. The rig management system of claim 12, wherein the one or more processors are further configured to:
 utilize a model to determine an expected measure of the vibration of the multiple elements based on the operating condition data after receiving the operating condition data.

14. A hydraulic fracturing rig comprising:
 multiple elements; and
 a rig management system, wherein the rig management system is configured to:
  utilize a model to determine an expected measure of vibration of multiple elements of the hydraulic fracturing rig for operating conditions of the hydraulic fracturing rig based on operating condition data;
  receive vibration data from a set of sensors installed on one or more elements of the hydraulic fracturing rig,
  wherein the vibration data indicates a measure of the vibration of the multiple elements of the hydraulic fracturing rig,
  wherein the multiple elements include:
   a driveshaft, and
   a set of bearings associated with the driveshaft;
  perform a first processing of the vibration data utilizing a moving window technique to identify a possible failure of the set of bearings;
  perform a second processing utilizing a set of processing techniques or the model after identifying the possible failure of the set of bearings;
  determine that the possible failure is an actual failure based on a result of performing the second processing; and
  perform an action after determining that the possible failure is the actual failure.

15. The hydraulic fracturing rig of claim 14, wherein the rig management system is further configured to:
 receive the operating condition data from another set of sensors or a component associated with the hydraulic fracturing rig prior to utilizing the model.

16. The hydraulic fracturing rig of claim 15, wherein the rig management system is further configured to:
 detect, via the other set of sensors or the component, a change in the operating condition data; and
 utilize another model, for the operating condition data that has changed, after detecting the change in the operating condition data.

17. The hydraulic fracturing rig of claim 14, wherein the rig management system, when performing the action, is configured to:
 generate a work ticket for the hydraulic fracturing rig after determining that the possible failure is the actual failure; and
 output the work ticket after generating the work ticket.

18. The hydraulic fracturing rig of claim 14, wherein the set of processing techniques includes at least one of:
 utilizing one or more data filters, or
 utilizing a peak-to-peak value check.

* * * * *